S. B. BUCK.
Carriage Wheel.
No. 105,546.                                    Patented July 19, 1870.
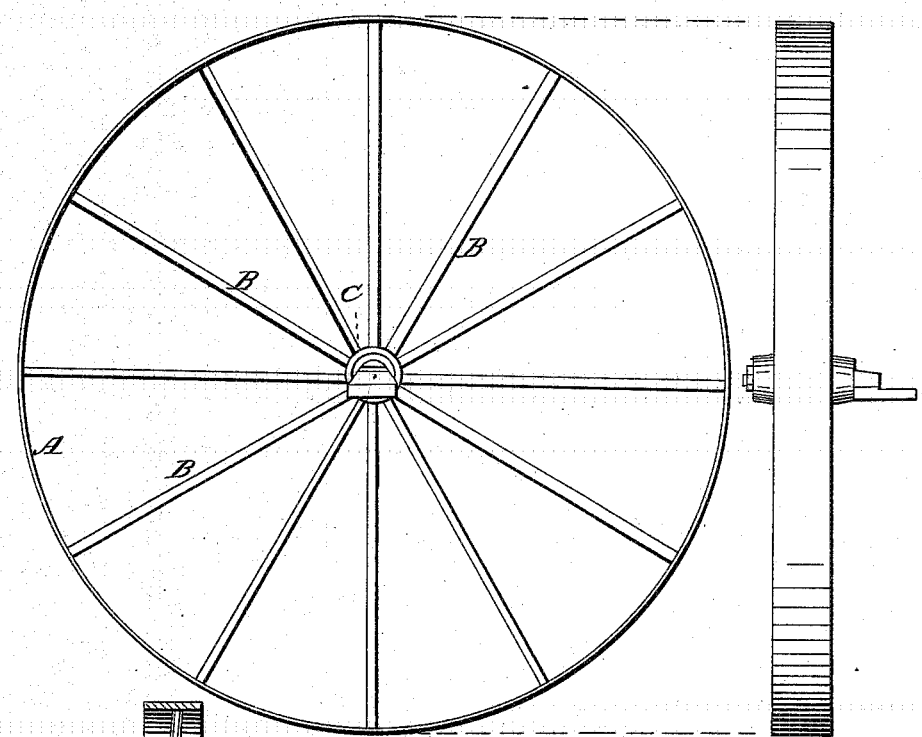
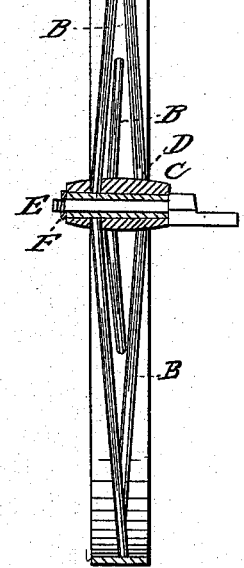
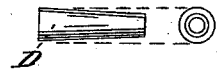

United States Patent Office.

SENECA B. BUCK, OF ELYRIA, OHIO.

Letters Patent No. 105,546, dated July 19, 1870.

IMPROVEMENT IN CARRIAGE-WHEEL.

The Schedule referred to in these Letters Patent and making part of the same.

*To all whom it may concern:*

Be it known that I, SENECA B. BUCK, of Elyria, in the county of Lorain and State of Ohio, have invented a certain new and improved Wheel; and I do hereby declare that the following is a full, clear, and complete description of the same, reference being had to the accompanying drawing making part of this specification.

Description of the Drawing.

Figure 1 is a side view of the wheel.
Figure 2, a transverse section.
Figures 3 and 4, detached sections.
Like letters of reference refer to like parts in the several views.

General Description.

The nature of this invention relates to a carriage-wheel, the spokes of which are forced outwardly from the nave by means of a bush fitted therein, thereby rendering the spokes tight in their connection with the rim of the wheel. The said bush forms the box for the axle on which turns the wheel, as hereinafter more fully set forth.

In the drawing, fig. 1—

A represents the rim of the wheel, which is or may be constructed of iron.

B are the spokes, which are also of iron, the outer ends thereof being secured, in a rigid manner, to the rim, whereas, their inner ends are fitted snugly but not tightly, in the hub C, and through which they penetrate, so as to come in contact with the thimble or box D, fig. 3, fitted to the nave of the wheel in a slightly tapering manner, so that, on being forced into the hub, it will fit tightly therein, as shown in fig. 2.

The practical construction of this wheel is as follows:

A piece of stout band-iron, of the proper length for the rim of the wheel, is bent to the proper shape, and the ends riveted together.

The outer ends of the spokes are then secured to the rim, and their inner ends inserted in the mortise holes around the hub, so that they will project into the axial bore.

The loose spokes are now forced outwardly by means of the box or thimble referred to, which, on being inserted in the bore of the nave, will press upon the intruded ends of the spokes, and cause them to move out from the hub, thereby giving tension to the spokes and rim, so that the whole structure becomes firm and rigid.

The thimble or box is prevented from coming out of the nave by means of the axle E, on which the wheel runs, a detached view of which is shown in fig. 4.

The shoulder *a* of the axle bears against the end of the hub, thereby preventing the thimble from sliding out therefrom; whereas, the taper of the thimble prevents it from coming out at the opposite end, while the nut F retains the axle in place.

A wheel thus constructed is light and cheaply made, and, when not required for heavy burdens, but used for horse-rakes, seeding-machines, &c., for which it is especially intended, it is sufficiently strong and durable.

Claim.

What I claim as my invention, and desire to secure by Letters Patent, is—

The conical box or pipe D, axle E, and nut F, in combination with the nave C, spokes B, and rim A, arranged in relation to each other, as and for the purpose substantially specified.

SENECA B. BUCK.

J. H. BURRIDGE,
D. L. HUMPHREY.